United States Patent
Pecher

(10) Patent No.: US 11,958,530 B2
(45) Date of Patent: Apr. 16, 2024

(54) MOTOR VEHICLE, IN PARTICULAR PASSENGER CAR

(71) Applicant: Bayerische Motoren Werke Aktiengesellschaft, Munich (DE)

(72) Inventor: Maximilian Pecher, Allershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 146 days.

(21) Appl. No.: 17/641,932

(22) PCT Filed: Aug. 11, 2020

(86) PCT No.: PCT/EP2020/072471
§ 371 (c)(1),
(2) Date: Mar. 10, 2022

(87) PCT Pub. No.: WO2021/047840
PCT Pub. Date: Mar. 18, 2021

(65) Prior Publication Data
US 2022/0324514 A1  Oct. 13, 2022

(30) Foreign Application Priority Data

Sep. 11, 2019  (DE) ...................... 10 2019 124 338.6

(51) Int. Cl.
*B62D 21/11* (2006.01)
*B62D 21/15* (2006.01)

(52) U.S. Cl.
CPC ............ *B62D 21/11* (2013.01); *B62D 21/155* (2013.01)

(58) Field of Classification Search
CPC .... B62D 21/152; B62D 25/082; B62D 21/03; B62D 21/11; B62D 25/08; B62D 21/155
(Continued)

(56) References Cited

U.S. PATENT DOCUMENTS 4,030,772 A     6/1977  Jacob et al.
8,888,168 B2 *  11/2014 Kuwabara ............ B62D 25/082
                                            296/187.1
(Continued)

FOREIGN PATENT DOCUMENTS

CN      101559786 A     10/2009
CN      102874194 A     1/2013
(Continued)

OTHER PUBLICATIONS

International Search Report (PCT/ISA/210) issued in PCT Application No. PCT/EP2020/072471 dated Nov. 11, 2020 with English translation (five (5) pages).
(Continued)

*Primary Examiner* — Paul N Dickson
*Assistant Examiner* — Caitlin Anne Miller
(74) *Attorney, Agent, or Firm* — Crowell & Moring LLP

(57) ABSTRACT

A motor vehicle has a chassis on which vehicle wheels of an axle of the motor vehicle that are rearmost in the vehicle longitudinal direction are rotatably held. The chassis has longitudinal members, which are arranged on the rear of the motor vehicle and are mutually spaced apart in the vehicle transverse direction. The longitudinal members each have at least one length region that runs rearward and inward obliquely to the vehicle longitudinal direction behind the respective center points of the vehicle wheels with respect to the vehicle longitudinal direction.

10 Claims, 1 Drawing Sheet

(58) Field of Classification Search
USPC .................................. 280/124.109, 124.171
See application file for complete search history.

(56) References Cited

U.S. PATENT DOCUMENTS

| | | | |
|---|---|---|---|
| 9,079,620 B2* | 7/2015 | Komiya | B62D 21/11 |
| 9,623,911 B2* | 4/2017 | Kano | B62D 21/11 |
| 2009/0102236 A1* | 4/2009 | List | B62D 21/11 |
| | | | 296/187.09 |
| 2010/0052368 A1* | 3/2010 | Yamaguchi | B62D 25/2027 |
| | | | 296/203.04 |
| 2013/0320709 A1 | 12/2013 | Kuwabara et al. | |
| 2014/0368000 A1 | 12/2014 | Komiya | |
| 2017/0001667 A1* | 1/2017 | Ashraf | B60K 1/00 |
| 2017/0182873 A1 | 6/2017 | Baccouche et al. | |
| 2020/0102014 A1* | 4/2020 | Sakai | B62D 21/07 |
| 2020/0385060 A1* | 12/2020 | Carl | B60R 19/18 |

FOREIGN PATENT DOCUMENTS

| | | |
|---|---|---|
| CN | 202827752 U | 3/2013 |
| CN | 204605715 U | 9/2015 |
| DE | 767 141 C | 3/1952 |
| DE | 24 50 763 | 4/1976 |
| DE | 103 09 628 A1 | 9/2004 |
| DE | 10 2009 008 674 A1 | 8/2010 |
| DE | 10 2013 204 313 A1 | 10/2013 |
| DE | 10 2015 207 696 A1 | 10/2016 |
| DE | 10 2015 005 894 A1 | 11/2016 |
| DE | 20 2016 107 008 U1 | 5/2017 |
| DE | 10 2018 008 798 A1 | 6/2019 |
| DE | 10 2018 000 065 A1 | 7/2019 |
| EP | 2 990 307 A2 | 3/2016 |
| WO | WO 2014/112265 A1 | 7/2014 |

OTHER PUBLICATIONS

German-language Written Opinion (PCT/ISA/237) issued in PCT Application No. PCT/EP2020/072471 dated Nov. 11, 2020 (five (5) pages).

German-language Office Action issued in German Application No. 10 2019 124 338.6 dated Apr. 16, 2020 (five (5) pages).

English translation of Chinese Office Action issued in Chinese Application No. 202080061579.6 dated Apr. 10, 2023 (seven (7) pages).

* cited by examiner

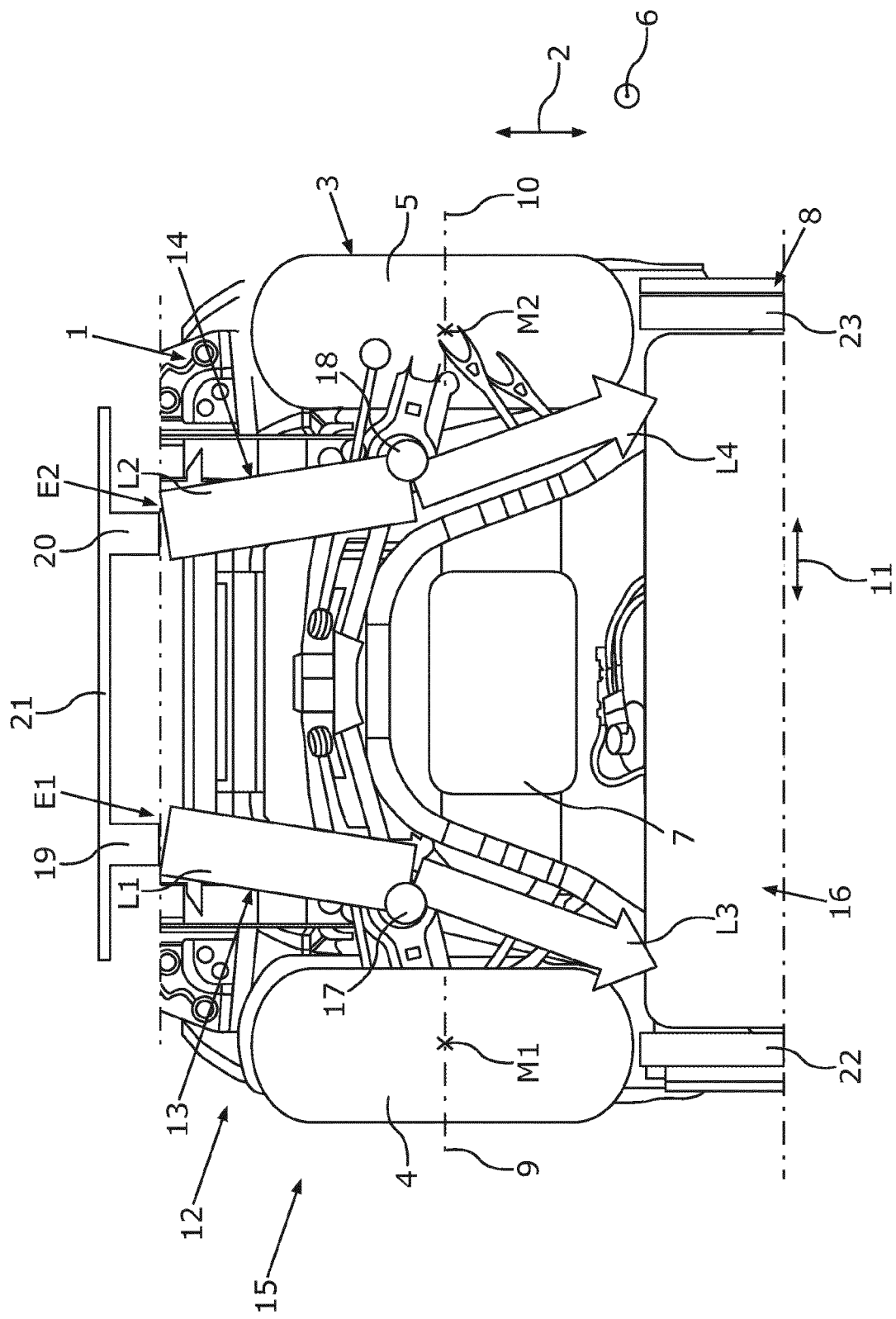

MOTOR VEHICLE, IN PARTICULAR PASSENGER CAR

BACKGROUND AND SUMMARY OF THE INVENTION

The invention relates to a motor vehicle, in particular a passenger car, on which rearmost vehicle wheels of an axle of the motor vehicle are held rotatably, wherein the chassis has longitudinal beams which are arranged at a rear of the motor vehicle and are spaced apart from one another in a vehicle transverse direction.

DE 10 2015 207 696 A1 discloses a deflector structure for a front structure of a motor car, which deflector structure comprises lateral deflector elements which are arranged above front main longitudinal beams.

A fastening structure for fastening a rear subframe to a vehicle body can be gathered as known from US 2014/0368000 A1. Moreover, DE 10 2018 008 798 A1 has disclosed a fastening arrangement of an energy absorption element on a longitudinal beam for a motor vehicle.

It is an object of the present invention to provide a motor vehicle, with the result that a particularly advantageous accident behavior of the motor vehicle can be realized.

According to the invention, this object is achieved by way of a motor vehicle with the features of the independent claim. Advantageous developments of the invention can be gathered from the remaining claims.

A first aspect of the invention relates to a motor vehicle which is preferably configured as a motor car, in particular as a passenger car, which motor vehicle comprises a chassis. Rearmost (in the vehicle longitudinal direction) vehicle wheels of an axle of the motor vehicle are held rotatably on the chassis. In other words, vehicle wheels of the motor vehicle are held at least indirectly rotatably on the chassis, the vehicle wheels being the rearmost (in the vehicle longitudinal direction) vehicle wheels of the motor vehicle. Moreover, the wheels are constituent parts of an axle, in particular of the rearmost axle in the vehicle longitudinal direction, of the motor vehicle, the vehicle wheels which are also simply called wheels being spaced apart from one another, for example, in the vehicle transverse direction. The vehicle wheels are ground contact elements of the motor vehicle which can be supported or are supported on the ground by the vehicle wheels toward the bottom in the vehicle vertical direction. When the motor vehicle is driven along the ground, while the motor vehicle is supported on the ground via the ground contact elements toward the bottom in the vehicle vertical direction, the wheels roll on the ground. For example, the motor vehicle comprises a second axle which is arranged in front of the first axle in the vehicle longitudinal direction and is therefore configured, for example, as a front axle. Therefore, the first axle is, for example, a rear axle. The second axle comprises at least or precisely two second vehicle wheels, preferably spaced apart from one another in the vehicle transverse direction, as ground contact elements of the motor vehicle. The first axle which is preferably a rear axle preferably comprises precisely two vehicle wheels in the form of the first vehicle wheels. For example, the motor vehicle comprises precisely two axles in the form of the first axle and the second axle.

The chassis comprises longitudinal beams which are arranged at the rear of the motor car and are spaced apart from one another in the vehicle transverse direction. Since the longitudinal beams are arranged at the rear of the motor vehicle or in a rear car region of the motor vehicle, the longitudinal beams are also called rear longitudinal beams.

In order for it then to be possible for a particularly advantageous accident behavior of the motor vehicle which is preferably configured as a hybrid or electric vehicle, in particular as a battery-electric vehicle, to be realized, it is provided according to the invention that the longitudinal beams comprise in each case at least one length region which runs toward the rear obliquely with respect to the vehicle longitudinal direction behind the respective center points of the rearmost (in the vehicle longitudinal direction) vehicle wheels of the motor vehicle in the vehicle longitudinal direction. In other words, the longitudinal beams comprise in each case at least one length region which is arranged or runs behind the respective center points of the rearmost vehicle wheels in the vehicle longitudinal direction, the respective length region running on the inside toward the rear obliquely with respect to the vehicle longitudinal direction. Therefore, for example, the length regions run toward one another on the inside toward the rear in the vehicle longitudinal direction or run away from one another on the outside toward the front in the vehicle longitudinal direction. The rearmost vehicle wheels are preferably arranged coaxially with respect to one another, with the result that the center points of the vehicle wheels lie on a common straight line which runs at least substantially in the vehicle transverse direction or parallel to the vehicle transverse direction. The respective wheel is rotatable relative to the chassis, for example, about a respective wheel rotational axis. Here, the respective wheel rotational axis runs through the respective center point of the respective vehicle wheel. If the vehicle wheels are preferably arranged coaxially with respect to one another, the wheel rotational axes coincide, with the result that the vehicle wheels are rotatable relative to the chassis about the respective wheel rotational axis which is common to the vehicle wheels. Here, the respective length region runs on the inside toward the rear obliquely with respect to the vehicle longitudinal direction behind the center points and therefore behind the respective wheel rotational axis in the vehicle longitudinal direction.

The invention is based, in particular, on the following findings: rear longitudinal beams usually run in their rear regions at least substantially parallel to the vehicle longitudinal direction and are arranged here very far to the outside in the vehicle transverse direction and are therefore spaced apart from one another very widely. If no corresponding countermeasures are taken, main load paths, via which, for example, accident-induced loads can be transmitted in the case of a rear impact, in particular in the case of a high speed rear impact, do not overlap on the side away from the impact with a barrier which strikes the rear of the motor vehicle during the rear impact. As a consequence, the entire potential of the chassis or motor vehicle cannot be utilized, in order to dissipate accident energy. Moreover, respective, front regions, the longitudinal beams which are also called rear longitudinal beams, should be arranged in the vehicle transverse direction and as far as possible to the outside, in order to provide a particularly large loading width and space for drive and/or chassis components, such as, for example, an electric machine for (in particular, pure) electrical driving of the motor vehicle. If meeting high requirements in the case of a high speed rear impact is then provided, for example, within the context of development of a motor vehicle, this can usually be realized only with high costs and weight, since the main load paths are disadvantageously selected in early phases of the development. The abovementioned disadvantages and problems can then be avoided or solved by way of the invention in a particularly favorable manner in terms of cost and weight. By way of the use of the described length regions, an (in particular, geometric) optimization of main load paths at the rear and for a rear impact can be realized in a particularly favorable way in terms of cost and weight in comparison with conventional solutions, in particular with consideration of an overlap of a barrier which hits the rear, in particular in relation to a width of the motor vehicle running in the vehicle transverse direction. In particular, it is possible as a result of the obliquely running length regions for load paths to be provided as paths which are away from the impact and are in overlap with the barrier. At the same time, a sufficiently large loading width can be realized or maintained.

In order for it to be possible for a particularly advantageous accident behavior to be realized and, at the same time, for a particularly large loading width and space for drive and/or chassis components to be provided, it is provided in the case of one embodiment of the invention that at least one supporting element, configured, for example, as a plate or spring collar, is provided on the respective longitudinal beam, on which supporting element a respective spring element is supported toward the top in the vehicle vertical direction on the respective longitudinal beam. Via the respective spring element, the respective vehicle wheel is supported on the respective longitudinal beam toward the top in the vehicle vertical direction, and is therefore supported in a sprung manner on the chassis. It is provided here that the respective length region runs on the inside toward the rear obliquely with respect to the vehicle longitudinal direction behind the respective supporting element in the vehicle longitudinal direction. In other words, the respective length region is arranged behind the respective supporting element in the vehicle longitudinal direction, and runs here on the inside toward the rear in the vehicle longitudinal direction behind the respective supporting element in the vehicle longitudinal direction. As a result, a front region, arranged in front of the respective length region in the vehicle longitudinal direction, of the respective longitudinal beam can be arranged particularly far to the outside in the vehicle transverse direction, in order to provide advantageous installation space.

A further embodiment is distinguished by the fact that the respective length region is arranged in the rearmost quarter in the vehicle longitudinal direction, in particular in the rearmost third in the vehicle longitudinal direction, of the respective longitudinal beam. As a result, the length regions can be arranged toward the inside in the vehicle longitudinal direction particularly close to one another, and particularly close to the center of the motor vehicle. The front regions can be spaced apart far from one another in the vehicle transverse direction, however, with the result that firstly a particularly advantageous accident behavior and secondly sufficient space for drive and/or chassis components can be provided.

It has been shown to be particularly advantageous if the respective length region forms a respective end of the respective longitudinal beam, the respective longitudinal beam ending at the end toward the rear in the vehicle longitudinal direction. The end is therefore a constituent part of the obliquely running length region. As a result, a particularly advantageous accident behavior can be realized in a favorable way in terms of installation space.

In order for it to be possible for a particularly advantageous accident behavior to be realized, it is provided in a further refinement of the invention that a respective, second length region of the respective longitudinal beam adjoins the respective length region toward the rear in the vehicle longitudinal direction, the respective second length region running parallel to the vehicle longitudinal direction. As a result, for example, respective energy absorption elements (also called "crash boxes") can be attached to the longitudinal beams via the second length regions in a particularly simple and therefore favorable manner in terms of time and cost, with the result that a particularly advantageous accident behavior can be produced.

It is provided in a further refinement of the invention that the chassis is configured as a ladder frame or as a monocoque vehicle body of the motor vehicle. As a result, a particularly advantageous accident behavior can be produced.

In the case of one particularly advantageous embodiment of the invention, the respective longitudinal beam is assigned an energy absorption element which is arranged behind the respective longitudinal beam in the vehicle longitudinal direction, is configured separately from the longitudinal beam, and is fastened to the respective longitudinal beam which is assigned the respective energy absorption element. Moreover, the motor vehicle comprises a flexible crossmember which is arranged at the rear and is configured separately from the longitudinal beams and separately from the energy absorption elements which are configured separately from one another, which flexible crossmember is arranged behind the respective longitudinal beams in the vehicle longitudinal direction and is attached via the energy absorption elements to the longitudinal beams. To this end, for example, the energy absorption elements are connected at least indirectly, in particular directly, to the flexible crossmember. By means of the flexible crossmember, for example in the case of a rear impact, accident-induced loads can be transmitted particularly advantageously to the longitudinal beams and can therefore be received and absorbed. Here, in the case of an accident such as, for example, in the case of a rear impact, the respective energy absorption element can be deformed, in particular plastically, with the dissipation of energy, with the result that accident energy can be converted into deformation energy and can be absorbed as a result by means of the respective energy absorption element with accident-induced deformation of the energy absorption element. As a result, particularly high safety can be produced.

A further embodiment is distinguished by the fact that an energy store for storing electrical energy or electrical current is arranged in front of the first length regions in the vehicle longitudinal direction. The energy store is preferably a battery. In particular, the energy store can be a high voltage energy store, in particular a high voltage battery (HV battery), the high voltage energy store having an electrical voltage, in particular an electrical operating or nominal voltage, which is greater than 50 volts and is preferably several hundred volts. By means of the electrical energy which is stored in the energy store, at least one electric machine can be supplied, as a result of which, for example, the electric machine can be operated as an electric motor. The electric machine is preferably a traction machine, by means of which the motor vehicle can be driven (in particular, purely) electrically. By way of the use of the first length regions, for example, the energy store can be protected particularly advantageously against accident-induced loads, with the result that a particularly satisfactory accident behavior of the motor vehicle can be produced.

The energy store is arranged, for example, in an undertray or below the undertray, the undertray being formed, for example, by way of the monocoque vehicle body or by way of the chassis. In particular, the energy store is arranged in the region of a passenger compartment. This is to be understood to mean, in particular, that, for example, an interior compartment of the motor vehicle, which interior compartment is formed, in particular, at least partially by way of the monocoque vehicle body and in which at least one person can be located, is covered at least partially by way of the energy store toward the bottom in the vehicle vertical direction. Here, the energy store is attached, in particular screwed, at least indirectly, in particular directly, to the chassis, in particular to the monocoque vehicle body.

In order for it to be possible for the energy store to be protected particularly advantageously and, as a consequence, for a particularly satisfactory accident behavior of the motor vehicle to be realized, it is provided in a further refinement of the invention that the energy store is covered at least partially by way of the flexible crossmember toward the rear in the vehicle longitudinal direction.

Finally, it has been shown to be particularly advantageous if the longitudinal beams comprise in each case at least one further length region which runs on the outside toward the front obliquely with respect to the vehicle longitudinal direction in front of the respective center points of the vehicle wheels in the vehicle longitudinal direction. Via the further length regions, the longitudinal beams can merge, for example, toward the front in the vehicle longitudinal direction into respective side sills of the chassis, in particular of the monocoque vehicle body. As a result, a particularly large width of the chassis in front of the center points of the vehicle wheels (the center points of which are also called wheel center points) in the vehicle longitudinal direction can be realized, with the result that space for drive and/or chassis components can be provided and a particularly large loading width can be produced.

Details of the invention emerge from the following text on the basis of the description of the FIGURE.

BRIEF DESCRIPTION OF THE DRAWING

The single FIGURE shows details of a diagrammatic bottom view of a motor vehicle according to an embodiment of the invention which is preferably configured as a motor car, in particular as a passenger car.

DETAILED DESCRIPTION OF THE DRAWING

The single FIGURE shows a diagrammatic bottom view of details of a motor vehicle 1 which is configured as a motor car, in particular as a passenger car, and is preferably configured as an electric vehicle, in particular as a battery-electric vehicle. The motor vehicle 1 comprises precisely two axles which are spaced apart from one another in the vehicle longitudinal direction, the vehicle longitudinal direction being illustrated by way of a double arrow 2 in the single FIGURE. The frontmost (in the vehicle longitudinal direction) one of the axles is what is known as a front axle, the rearmost (in the vehicle longitudinal direction) axle of the motor vehicle 1 being visible in the FIGURE and being denoted by 3. The axle 3 is therefore a rear axle of the motor vehicle 1. The respective axle comprises at least or precisely two vehicle wheels (also simply called wheels) which are spaced apart from one another in the vehicle transverse direction, the vehicle wheels of the axle 3 being denoted by 4 and 5 in the FIGURE. The wheels are ground contact elements, via which the motor vehicle 1 can be supported or is supported on the ground toward the bottom in the vehicle vertical direction in its completely manufactured state. The vehicle vertical direction is illustrated by way of a double arrow 6 in the FIGURE, and runs perpendicularly with respect to the plane of the drawing of the FIGURE. The axle 3 comprises at least or precisely one electric machine 7 which can be supplied with electrical energy or electrical current and can be operated as an electric motor as a result. The wheels 4 and 5 and therefore the motor vehicle 1 overall can be driven (in particular, purely) electrically by means of the electric motor, with the result that the electric machine 7 is also called a traction machine.

Moreover, the motor vehicle 1 comprises a chassis which is configured as a monocoque vehicle body 8 in the case of the exemplary embodiment which is shown in the figure. The axle 3 is a constituent part of a chassis which is mounted at least indirectly, in particular directly, on the monocoque vehicle body 8. Here, the wheels 4 and 5, the respective center points of which are denoted by M1 and M2, respectively, in the FIGURE, are held at least indirectly, in particular directly, rotatably on the vehicle body 8. Therefore, the respective wheel 4 and 5 can rotate about a respective rotational axis 9 and 10, respectively, relative to the vehicle body 8, the rotational axis 9 of the vehicle wheel 4 running through the center point M1 of the vehicle wheel 4, and the rotational axis 10 of the vehicle wheel 5 running through the center point M2 of the vehicle wheel 5. The center points M1 and M2 are called wheel center points. In the case of the exemplary embodiment which is shown in the FIGURE, the vehicle wheels 4 and 5 are arranged coaxially with respect to one another, with the result that the rotational axes 9 and 10 which run parallel to the vehicle transverse direction coincide. Here, the vehicle transverse direction is illustrated by way of a double arrow 11 in the FIGURE.

Moreover, the vehicle body 8 comprises longitudinal beams 13 and 14 which are also called rearward longitudinal beams or rear longitudinal beams and are arranged at the rear 12 of the motor vehicle 1. The feature that the longitudinal beams 13 and 14 are arranged at the rear 12 of the motor vehicle 1 is to be understood to mean, in particular, that the rear longitudinal beams 13 and 14 are arranged or run in a rear car region 15 of the motor vehicle 1 or the vehicle body 8. Here, the longitudinal beams 13 and 14 are arranged behind an interior compartment, also called a passenger compartment and at least partially delimited by way of the vehicle body 8, of the motor vehicle 1 in the vehicle longitudinal direction, in the interior compartment of which motor vehicle persons can be located, such as, for example, the driver of the motor vehicle 1.

As will be described in more precise detail in the following text, the motor vehicle 1 also comprises at least one energy store 16 which is configured, for example, as a battery, in particular as a high voltage battery, and is arranged, for example, in or below (in the vehicle vertical direction) an undertray of the vehicle body 8. Electrical energy can be stored in the energy store 16 or by means of the energy store 16, with which electrical energy the electric machine 7 can be supplied in order, as a result, to operate the electric machine 7 as an electric motor for (in particular, purely) electric driving of the vehicle wheels 4 and 5. The energy store 16 is therefore also called an electrical energy store and can comprise a plurality of modules or storage cells which are connected electrically to one another. The energy store 16 is connected, for example, to the vehicle body 8, in particular is screwed to the vehicle body 8.

In order for it then to be possible for a particularly advantageous accident behavior of the motor vehicle 1 to be realized, the longitudinal beams 13 and 14 comprise in each case at least one length region L1 and L2, respectively, which runs on the inside toward the rear obliquely with respect to the vehicle longitudinal direction behind the respective center points M1 and M2 of the vehicle wheels 4 and 5 in the vehicle longitudinal direction.

At least one supporting element 17 and 18 which is shown particularly diagrammatically in the FIGURE is provided on the respective longitudinal beam 13 and 14, respectively. The respective supporting element 17 and 18 is configured, for example, in one piece with the respective longitudinal beam 13 and 14, respectively, or else the respective supporting element 17 and 18 is configured separately from the respective longitudinal beam 13 and 14, respectively, and is connected to the respective longitudinal beam 13 and 14, respectively. A respective, in particular mechanical, spring element is supported toward the top in the vehicle vertical direction on the respective supporting element 17 and 18. The respective spring element is a constituent part of the abovementioned chassis, the vehicle wheel 4 being supported toward the top in the vehicle vertical direction on the longitudinal beam 13 in a manner which is sprung via the spring element which is supported toward the top in the vehicle vertical direction on the supporting element 17 which is provided on the longitudinal beam 13. Accordingly, the vehicle wheel 5 is supported toward the top in the vehicle vertical direction on the longitudinal beam 14 in a manner which is sprung via the spring element which is supported toward the top in the vehicle vertical direction on the supporting element 18 which is provided on the longitudinal beam 14. Here, the respective length region L1 and L2 of the respective longitudinal beam 13 and 14 runs on the inside toward the rear obliquely with respect to the vehicle longitudinal direction behind the respective supporting element 17 and 18 in the vehicle longitudinal direction. As a result, the rear length regions L1 and L2 can be arranged particularly close to one another in the vehicle transverse direction, in order, as a result, for it to be possible for accident-induced loads which are produced, for example, in the case of a rear impact to be received and absorbed particularly advantageously via the longitudinal beams 13 and 14 by means of the vehicle body 8. Regions of the longitudinal beams 13 and 14 which are arranged or run in front of the length regions L1 and L2 in the vehicle longitudinal direction can be arranged, however, particularly far on the outside in the vehicle transverse direction and therefore spaced apart particularly far from one another, in order, as a result, to provide a particularly large loading width and space for drive and/or chassis components.

It can be seen from the FIGURE, in particular, that it is particularly advantageous for realizing an advantageous accident behavior if the respective length region L1 and L2 is arranged or runs in the rearmost quarter in the vehicle longitudinal direction, in particular in the rearmost third in the vehicle longitudinal direction, of the respective longitudinal beam 13 and 14. It is fundamentally contemplated that the respective length region L1 and L2 forms a respective end E1 and E2 of the respective longitudinal beam 13 and 14. As an alternative to this, it is contemplated that a respective, second length region (not shown in the FIGURE) of the respective longitudinal beam 13 and 14 adjoins the respective length region L1 and L2 toward the rear in the vehicle longitudinal direction, the respective second length region running parallel to the vehicle longitudinal direction.

The motor vehicle 1 comprises energy absorption elements 19 and 20 which are also called crash boxes. The energy absorption element 19 is assigned to the longitudinal beam 13 and is configured separately from the longitudinal beams 13 and 14 and separately from the energy absorption element 20, and is fastened here to the longitudinal beam 13, in particular to the length region L1. The energy absorption element 20 is assigned to the longitudinal beam 14, is configured separately from the energy absorption element 19 and separately from the longitudinal beams 13 and 14, and is fastened to the longitudinal beam 14, in particular to the length region L2. For example, the energy absorption element 19 is fastened directly to the length region L1 or directly to the longitudinal beam 13, it being possible as an alternative or in addition for the energy absorption element 20 to be fastened directly to the length region L2 or directly to the longitudinal beam 14. As an alternative to this, it is contemplated that the energy absorption element 19 is fastened, in particular directly, to the second length region of the longitudinal beam 13, the energy absorption element 20 as an alternative or in addition being fastened, in particular directly, to the second length region of the longitudinal beam 14. Here, the energy absorption elements 19 and 20 are arranged behind the length regions L1 and L2 or behind the second length regions in the vehicle longitudinal direction.

Moreover, the motor vehicle 1 has a flexible crossmember 21 which is arranged at the rear 12 and is therefore a rear flexible crossmember 21 which extends at least substantially in the vehicle transverse direction. The flexible crossmember 21 is arranged separately from the longitudinal beams 13 and 14 and separately from the energy absorption elements 19 and 20, and is fastened, in particular directly, to the energy absorption elements 19 and 20. Therefore, the flexible crossmember 21 is attached via the energy absorption elements 19 and 20 to the longitudinal beams 13 and 14. If, for example, a rear impact occurs, within the context of which a barrier or an accident party hits the rear 12, accident-induced loads which result herefrom can be distributed particularly advantageously via the flexible crossmember 21 to the energy absorption elements 19 and 20 and further to the longitudinal beams 13 and 14, and can be received and absorbed by the latter. Here, the energy absorption elements 19 and 20 are deformable or deformed owing to the accident under the absorption of energy, as a result of which the energy absorption elements 19 and 20 convert accident energy into deformation energy and therefore absorb it.

In order for it to be possible for the energy store 16 to be protected particularly advantageously, for example in the case of a rear impact of this type, it is preferably provided that the energy store 16 is covered at least partially by way of the flexible crossmember 21 and/or by way of the energy absorption elements 19 and 20 toward the rear in the vehicle longitudinal direction.

Scaling of the length (running in the vehicle longitudinal direction) of the motor vehicle 1 can be produced by way of the second length regions and/or by way of the energy absorption elements 19 and 20 which preferably run parallel to the vehicle longitudinal direction, in particular with regard to their longitudinal extent direction.

Moreover, the longitudinal beams 13 and 14 comprise in each case at least one further length region L3 and L4, respectively, which runs on the outside toward the front obliquely with respect to the vehicle longitudinal direction in front of the respective center points M1 and M2 in the vehicle longitudinal direction. The length region L3 can run at least substantially parallel to the length region L1 of the longitudinal beam 13. As an alternative or in addition, the length region L4 of the longitudinal beam 14 can run at least substantially parallel to the length region L2 of the longitudinal beam 14. In the case of the exemplary embodiment which is shown in the FIGURE, however, it is provided that the length region L3 of the longitudinal beam 13 runs obliquely or at an angle with respect to the length region L1 of the longitudinal beam 13, and the length region L4 of the longitudinal beam 14 runs obliquely or at an angle with respect to the length region L2 of the longitudinal beam 14. Here, the longitudinal beams 13 and 14 merge via the length regions L3 and L4 toward the front in the vehicle longitudinal direction into respective side sills 22 and 23, spaced apart from one another in the vehicle transverse direction, of the monocoque vehicle body 8, the side sills 22 and 23 preferably running at least substantially parallel to the vehicle longitudinal direction. As a consequence, for example, the side sills 22 and 23 can be arranged spaced apart particularly far from one another in the vehicle transverse direction, in order to provide a large loading width and to realize space for drive and/or chassis components, in particular for the electric machine 7. For example, the energy store 16 is arranged between the side sills 22 and 23 in the vehicle transverse direction, in particular in such a way that the energy store 16 is covered in each case at least partially by way of the respective side sills 22 and 23 on both sides toward the outside in the vehicle transverse direction. Moreover, it is preferably provided that the longitudinal beams 13 and 14 are arranged between the vehicle wheels 4 and 5 in the vehicle transverse direction, in particular in such a way that the longitudinal beams 13 and 14, in particular the length regions L1 and L2, are covered at least partially by way of the vehicle wheels 4 and 5 toward the outside in the vehicle transverse direction.

By way of the use of the obliquely running length regions L1 and L2, main load paths can be designed for particularly low force levels, via which main load paths accident-induced loads are absorbed in the case of a rear impact, the main load paths running via the longitudinal beams 13 and 14. A bumper system which comprises, for example, the flexible crossmember 21 (also called a bumper crossmember) and the energy absorption elements 19 and 20 (also called crash boxes) then only has to satisfy requirements for a rear impact at low speeds, since, for example in the case of a rear impact at high speeds, an advantageous accident behavior can be realized by way of the obliquely running length regions L1 and L2. Further protective measures for components can be avoided or can be configured in a favorable manner in terms of cost and weight.

LIST OF DESIGNATIONS

1 Motor vehicle
2 Double arrow
3 Axle
4 Vehicle wheel
5 Vehicle wheel
6 Double arrow
7 Electric machine
8 Monocoque vehicle body
9 Wheel rotational axis
10 Wheel rotational axis
11 Double arrow
12 Rear
13 Longitudinal beam
14 Longitudinal beam
15 Rear car region
16 Energy store
17 Supporting element
18 Supporting element
19 Energy absorption element
20 Energy absorption element
21 Flexible crossmember
22 Side sill
23 Side sill
E1 End
E2 End
L1 Length region
L2 Length region
L3 Length region
L4 Length region
M1 Center point
M2 Center point

What is claimed is:

1. A motor vehicle, comprising:
 a chassis, on which rearmost vehicle wheels of an axle of the motor vehicle are held rotatably,
 the chassis comprising longitudinal beams which are arranged at a rear of the motor vehicle and are spaced apart from one another in a vehicle transverse direction, each respective longitudinal beam having a center axis, and
 at least one supporting element positioned on a respective longitudinal beam, each respective supporting element having a spring element coupled thereto, via which the respective vehicle wheel is supported on the respective longitudinal beam toward the top in the vehicle vertical direction,
 wherein each of the longitudinal beams comprise at least one length region in which the center axis of the longitudinal beam extends inwardly from each respective supporting element toward the rear obliquely with respect to a vehicle longitudinal direction behind respective center points of the vehicle wheels in the vehicle longitudinal direction.

2. The motor vehicle according to claim 1, wherein the respective length region is arranged in a rearmost quarter in the vehicle longitudinal direction of the respective longitudinal beam.

3. The motor vehicle according to claim 1, wherein the respective length region forms a respective end of the respective longitudinal beam.

4. The motor vehicle according to claim 1, wherein a respective, second, length region of the respective longitudinal beam adjoins the respective length region toward the rear in the vehicle longitudinal direction, the respective second length region extending parallel to the vehicle longitudinal direction.

5. The motor vehicle according to claim 1, wherein the chassis is configured as a ladder frame or as a monocoque vehicle body of the motor vehicle.

6. The motor vehicle according to claim 1, wherein the respective longitudinal beam is assigned an energy absorption element which is arranged behind the respective longitudinal beam in the vehicle longitudinal direction, is configured separately from the longitudinal beams, and is fastened to the respective longitudinal beam which is assigned the respective energy absorption element,
 a flexible crossmember, which is configured separately from the longitudinal beams and separately from the energy absorption elements which are configured separately from one another, is provided, which flexible crossmember is arranged behind the respective energy absorption elements in the vehicle longitudinal direction and is attached via the energy absorption elements to the longitudinal beams.

7. The motor vehicle according to claim 6, further comprising:
 an energy store for storing electrical energy arranged in front of the length regions in the vehicle longitudinal direction, with which electrical energy at least one electric machine for electrically driving the motor vehicle can be supplied.

8. The motor vehicle according to claim 7, wherein the energy store is covered at least partially by way of the flexible crossmember toward the rear in the vehicle longitudinal direction.

9. The motor vehicle according to claim 1, further comprising:
an energy store for storing electrical energy arranged in front of the length regions in the vehicle longitudinal direction, with which electrical energy at least one electric machine for electrically driving the motor vehicle can be supplied.

10. The motor vehicle according to claim 1, wherein each of the longitudinal beams comprise at least one further length region which runs from each respective supporting element outward toward the front obliquely with respect to the vehicle longitudinal direction in front of the respective center points of the vehicle wheels in the vehicle longitudinal direction.

\* \* \* \* \*